United States Patent
Leung et al.

(10) Patent No.: US 7,974,212 B2
(45) Date of Patent: Jul. 5, 2011

(54) DETERMINING QUALITY MONITORING ALERTS IN UNIFIED COMMUNICATION SYSTEMS

(75) Inventors: Yiu-Ming Leung, Kirkland, WA (US); Jisun Park, Bellevue, WA (US); BoRu Yan, Beijing (CN); Vincent Allio, Beijing (CN); Haoran Zheng, Beijing (CN); Jay Herbison, Beijing (CN)

(73) Assignee: Microsoft Corporation, Redmond, WA (US)

( * ) Notice: Subject to any disclaimer, the term of this patent is extended or adjusted under 35 U.S.C. 154(b) by 313 days.

(21) Appl. No.: 12/051,129

(22) Filed: Mar. 19, 2008

(65) Prior Publication Data

US 2009/0237240 A1 Sep. 24, 2009

(51) Int. Cl.
*H04J 1/16* (2006.01)
(52) U.S. Cl. ......... 370/252; 370/241; 370/352; 370/400
(58) Field of Classification Search .................. 370/241, 370/252, 352–354, 356, 400, 401
See application file for complete search history.

(56) References Cited

U.S. PATENT DOCUMENTS

| | | | |
|---|---|---|---|
| 6,643,613 B2 | 11/2003 | McGee et al. | 702/186 |
| 6,738,933 B2 | 5/2004 | Fraenkel et al. | 714/47 |
| 7,197,428 B1 | 3/2007 | Saghier et al. | 702/182 |
| 2005/0141493 A1 | 6/2005 | Hardy et al. | 370/356 |
| 2006/0098625 A1 | 5/2006 | King et al. | 370/352 |
| 2006/0111092 A1 | 5/2006 | Harris et al. | 455/418 |
| 2006/0146784 A1* | 7/2006 | Karpov et al. | 370/351 |
| 2006/0221848 A1 | 10/2006 | Lake | 370/242 |
| 2006/0252376 A1 | 11/2006 | Fok et al. | 455/67.13 |
| 2007/0133403 A1* | 6/2007 | Hepworth et al. | 370/229 |
| 2007/0248022 A1 | 10/2007 | Kumar et al. | 370/252 |
| 2007/0286351 A1* | 12/2007 | Ethier et al. | 379/32.01 |

* cited by examiner

*Primary Examiner* — Kwang B Yao
*Assistant Examiner* — Nguyen Ngo
(74) *Attorney, Agent, or Firm* — Merchant & Gould

(57) ABSTRACT

Performance of endpoints, client devices and servers within a communication system, is monitored by collecting call quality data from each endpoint. The collected metric data is retrieved periodically from a database, categorized based on endpoint location and metric type, and compared to predefined thresholds for different endpoint types, metric categories, and call configurations. If an alert condition is met indicating a problem with quality of experience in the system, an alert is issued to an administrator.

17 Claims, 7 Drawing Sheets

DETERMINING QUALITY MONITORING ALERTS IN UNIFIED COMMUNICATION SYSTEMS

BACKGROUND

Additional communication modes such as video, instant messaging, application or data sharing have proliferated in recent years with the availability of diverse types of communication networks and devices capable of taking advantage of various features of these networks. Some more recent systems (e.g. unified communication systems) take advantage of capabilities of modern networks and computing devices bringing together different communication networks and providing until now unavailable functionality such as combining various modes of communication, user defined routing mechanisms, and so on. In such systems, a network of servers manages end devices capable of handling a wide range of functionality and communication while facilitating communications between the more modern unified communication network devices and other networks (e.g. PSTN, cellular, etc.).

In a system that supports multiple forms of communication, it is important for administrators to be aware of the quality of experience delivered to the users by the system. This enables the administrators to adjust the configuration of the system as needed when the quality deteriorates. Quality of experience may degrade generally due to problems in the network(s) or problems in the computing devices through which the media travels. While comprehensive reports on various aspects of the system based on metrics collected over time may provide a useful tool to administrators for addressing long term network issues and upgrade/correction decisions, some problems may require immediate attention. For such problems, administrators typically need to know a nature of the problem and location of the problem (i.e. which machines or software the problem is associated with).

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to generating alerts associated with degradation of communication quality in a unified communication system, where the alerts provide adequate information to an administrator to act upon. Information provided by the alerts according to some embodiments may include nature of problem through various measured metrics and location of the problem through identification of an endpoint, which is any physical or virtual device that facilitates communication between end users of the communication system.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly discussed above, performance of endpoints in a communication system may be monitored quantitatively and systematically, and alerts generated based on predetermined conditions to enhance a quality of experience for the overall communication system. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

While the term "call" is mainly used in examples throughout this document as referring to voice communications, it is not so limited. "Call" may also be used in reference to video communications, conference communications, instant messaging, and other forms of communication discussed herein in conjunction with estimating endpoint performance.

Figure 1:
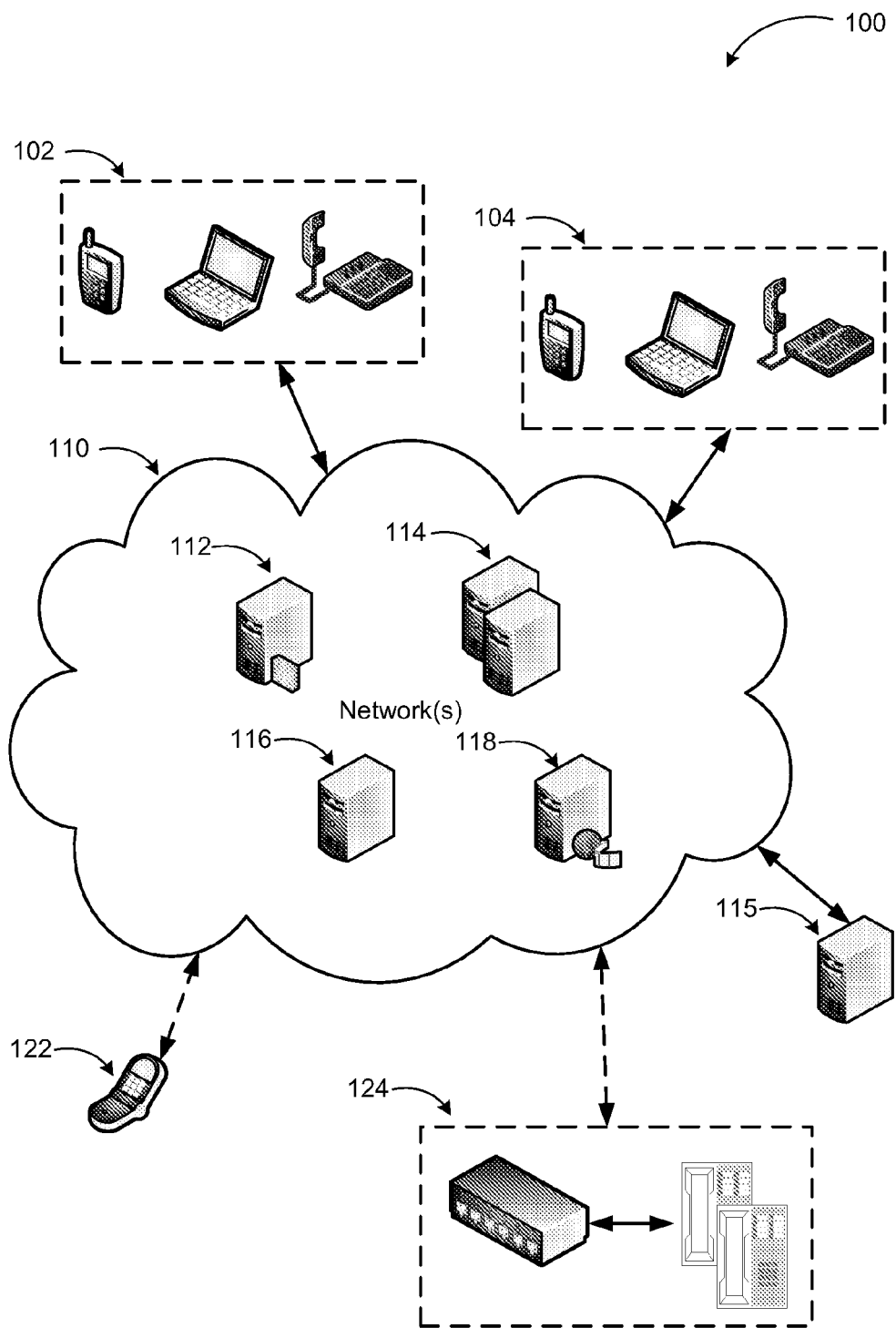
FIG. 1 is a diagram illustrating an example unified communications system.

Referring to FIG. 1, diagram 100 of an example unified communications system is illustrated. As discussed above, a system that supports multiple forms of communication with a complex interconnection of different networks and a large number of computing devices (servers, endpoints, specialized devices, etc.) may experience degradation of quality in the experience delivered to the users due to problems in the network(s) or problems in the computing devices. Without a systematic and well defined approach for detecting problems in a timely manner and specific information, it may be difficult, if not impossible, to determine problematic devices in a system with a large number of computing devices.

Embodiments are directed to determining and detecting alert conditions timely from call metrics data collected by a quality monitoring server and providing details related to where the problem may reside to an administrator. Thus, the capability of administrators to address quality issues promptly and efficiently for the overall communication system can be enhanced through an efficient and well designed alert process.

In a unified communication system such as the one shown in diagram 100, users may communicate via a variety of end devices (102, 104), which are client devices of the UC system. Each client device may be capable of executing one or more communication applications for voice communication, video communication, instant messaging, application sharing, data sharing, and the like. In addition to their advanced functionality, the end devices may also facilitate traditional phone calls through an external connection such as through PBX 124 to a Public Switched Telephone Network (PSTN). End devices may include any type of smart phone, cellular phone, any computing device executing a communication application, a smart automobile console, and advanced phone devices with additional functionality.

Unified Communication (UC) Network(s) 110 includes a number of servers performing different tasks. For example, UC servers 114 may provide registration, presence, and routing functionalities. Presence functionality enables the system to route calls to a user to anyone of the client devices assigned to the user based on default and/or user set policies. For example, if the user is not available through a regular phone, the call may be forwarded to the user's cellular phone, and if that is not answering a number of voicemail options may be utilized. Since the end devices can handle additional communication modes, UC servers 114 may provide access to these additional communication modes (e.g. instant messaging, video communication, etc.) through access server 112. Access server 112 resides in a perimeter network and enables connectivity through UC network(s) 110 with other users in one of the additional communication modes.

Audio/Video (A/V) conferencing server 118 provides audio and/or video conferencing capabilities by facilitating those over an internal or external network. Mediation server 116 mediates signaling and media to and from other types of networks such as a PSTN or a cellular network (e.g. calls through PBX 124 or from cellular phone 122). Mediation server 116 may also act as a Session Initiation Protocol (SIP) user agent (e.g. Business-To-Business User Agent "B2BUA").

Quality Monitoring Server (QMS) 115 is tasked with collecting communication data such as statistical data associated with quantitative and qualitative aspects of communications from endpoints within the system. Endpoint is a general term referring to each end device as well as any server that is directly involved with communications within UCN 110. For example, mediation server 116 and A/V conferencing server 118 are directly involved with the communication as nodes within the network. Therefore, performance of these servers may affect quality of communications (e.g. degradation due to delays in the servers), and thus they are considered endpoints.

In a UC system, users may have one or more identities, which is not necessarily limited to a phone number. The identity may take any form depending on the integrated networks, such as a telephone number, a Session Initiation Protocol (SIP) Uniform Resource Identifier (URI), or any other identifier. While any protocol may be used in a UC system, SIP is a preferred method. End devices and servers may communicate with each other via SIP (e.g. collection of communication quality information by the QMS from each endpoint).

The SIP is an application-layer control (signaling) protocol for creating, modifying, and terminating sessions with one or more participants. It can be used to create two-party, multiparty, or multicast sessions that include Internet telephone calls, multimedia distribution, and multimedia conferences. SIP is designed to be independent of the underlying transport layer.

SIP clients use Transport Control Protocol ("TCP") or User Datagram Protocol ("UDP") to connect to SIP servers and other SIP endpoints. SIP is primarily used in setting up and tearing down voice or video calls. However, it can be used in any application where session initiation is a requirement. These include event subscription and notification, terminal mobility, and so on. Voice and/or video communications are typically done over separate session protocols, typically Real Time Protocol ("RTP").

SIP is intended to provide a signaling and call setup protocol for IP-based communications that can support a superset of the call processing functions and features present in the PSTN. SIP by itself does not define these features, however. Rather, its focus is call-setup and signaling. SIP is also designed to enable the building of such features in network elements known as proxy servers and user agents. These are features that permit familiar telephone-like operations: dialing a number, causing a phone to ring, hearing ring back tones or a busy signal.

While the example system is described with specific servers and SIP features in this and following figures, many other components (e.g. servers, firewalls, data stores, etc.) and protocols may be employed in implementing embodiments using the principles described herein. Functionality of the systems enabling alert generation based on endpoint performance may also be distributed among the components of the systems differently depending on component capabilities and system configurations.

Figure 2:
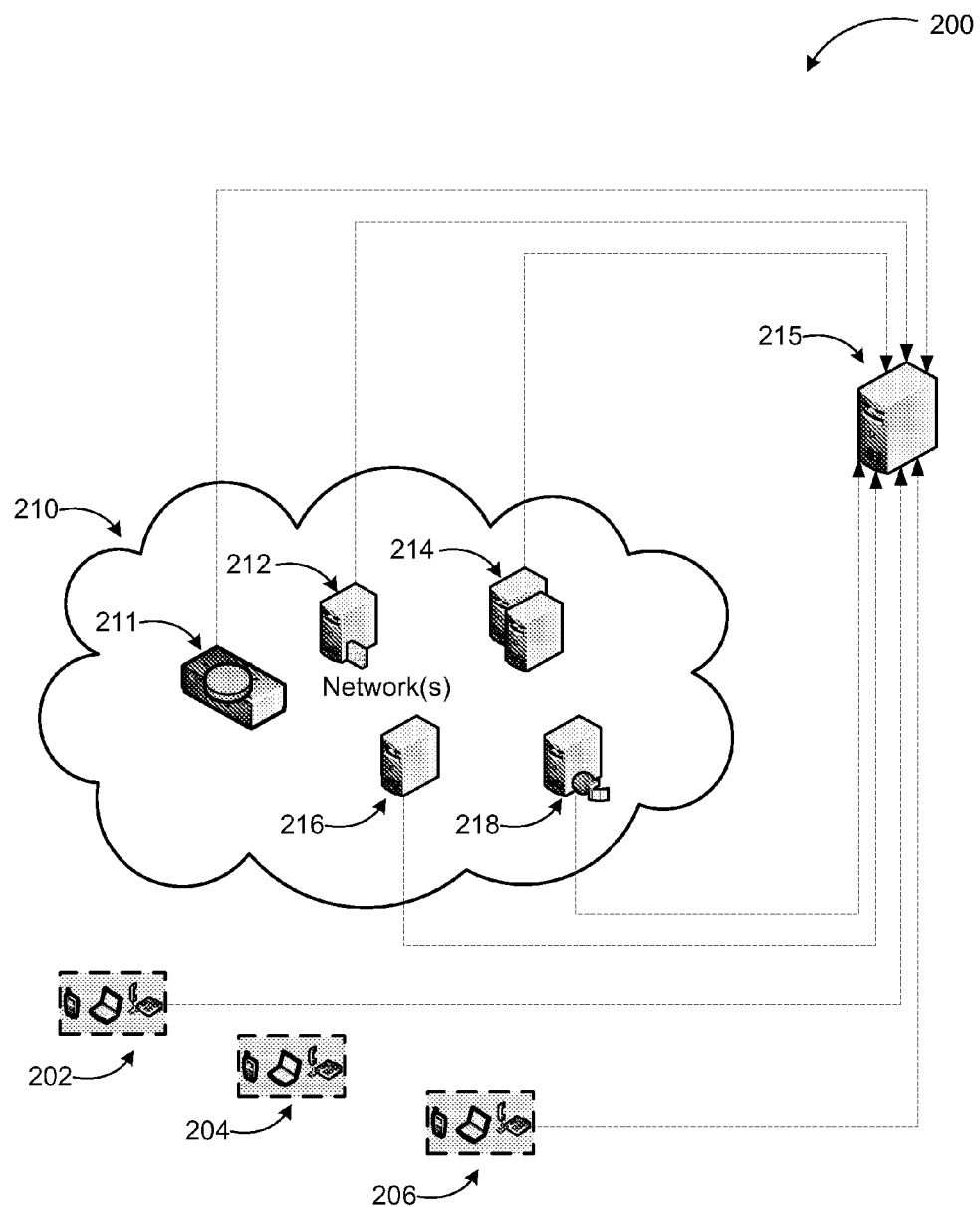
FIG. 2 illustrates a simplified unified communications system with communication quality information being collected by a quality monitoring server from endpoints within the system for analysis and alert generation purposes.

FIG. 2 illustrates a simplified unified communications system with communication quality information being collected by a quality monitoring server from endpoints within the system for analysis and alert generation purposes.

Network 210 in diagram 200 includes in addition to access server 212, UC server(s) 214, A/V conferencing server 218, and mediation server 216, Multipoint Conferencing Unit (MCU) 211. MCU 211 may be employed for facilitating conference calls, audio or video. Each of these servers as well as end devices 202, 204, and 206 are endpoints or machines that can affect communication quality. Thus, each machine is configured to collect call quality data and report the data to QMS 215 at the conclusion of each call or during each call. Alternatively, the collected data may be aggregated at the endpoints and provided to QMS 215 upon request or periodically.

The collected data may be provided to QMS 215 in an unstructured manner or in a structured manner in form of a report (e.g. in Extended Markup Language "XML" format). Such reports may include endpoint identification information such as an IP address/subnet mask of the endpoint, name of the endpoint device (computer), and various collected metric values such as those discussed below.

A number of metrics may be used in a communication system to determine performance quantitatively and qualitatively. A majority of these metrics may be measured by the endpoints (e.g. end devices, servers, etc.) during each call and then transmitted to QMS 215 for storage, aggregation, and analysis. The metrics may be uniform (i.e. measured and collected by all endpoints) or specific (e.g. metrics specific for video communication capable end devices, metrics for servers only, and the like). While a system according to embodiments may utilize any metrics to estimate endpoint performance, example ones are discussed herein.

Some example metrics according to a preferred embodiment include:
(1) call failure,
(2) network delay,
(3) Network Mean Opinion Score "NMOS" (predictive metrics based on network factors alone),
(4) Listen Mean Opinion Score "LMOS" (for decoded audio received by the reporting entity during a session as specified by ITU-TP800.1®),
(5) Send Mean Opinion Score "SMOS" (for pre-encoded audio sent by the reporting entity during a session as specified by ITU-TP800.1®),
(6) Conversation Mean Opinion Score "CMOS" (conversational clarity index for remote party as specified by ITU-TP562®).

QMS 215 may analyze the received data/reports, aggregate the metrics, and generate a system wide report based on the aggregations. The aggregations may be based on predefined formula to assign performance indices to individual endpoints and take into consideration additional factors such as traffic volume handled by an endpoint. QMS 215 also stores the data/reports in a local or remote data store for later retrieval, forwarding to other applications, and so on. In a system according to embodiments, a separate alert process may be executed on the collected reports to determine if an alert condition warranting immediate administrator attention has occurred, and the alert issued.

Figure 3:
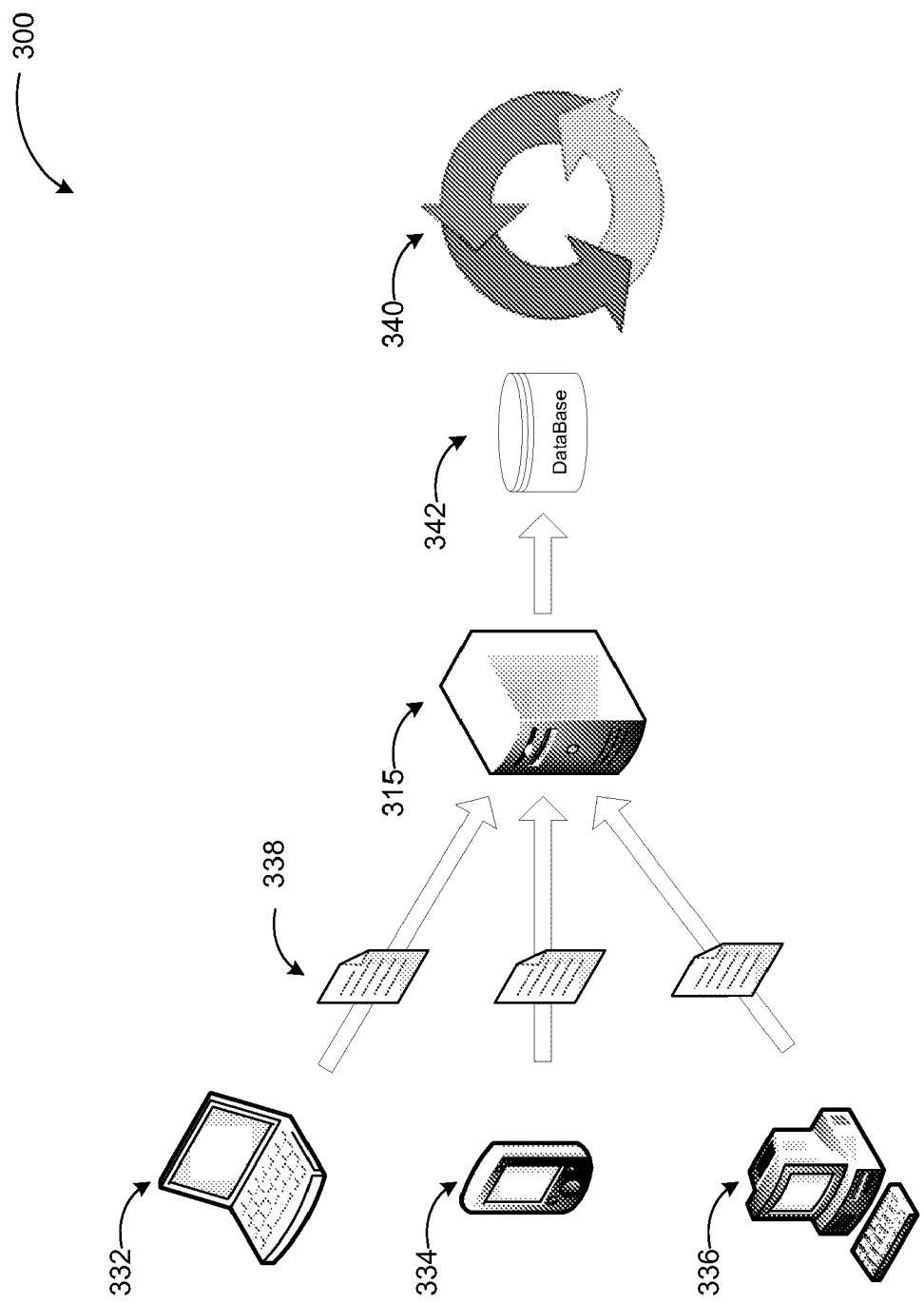
FIG. 3 is a conceptual diagram, illustrating collection of communication quality information, aggregation of collected results, and generation of alerts based on collected data according to embodiments.

FIG. 3 is a conceptual diagram, illustrating collection of communication quality information, aggregation of collected results, and generation of alerts based on collected data according to embodiments.

Endpoints, which may include servers, standalone devices associated with a unified communication network (e.g. an MCU), and end devices such as computers 332, 334, 336, each provide collected data 338 on communication quality to QMS server 315. The information may be provided during or at the end of each call (voice or otherwise), or aggregated and provided upon request or periodically. The information may be provided directly to QMS 315 via a protocol such as SIP or through an intermediary device. For example, each endpoint may store their collected information in a network data store and QMS 315 may retrieve the data from the data store later for analysis. The information may be provided in any form such as simple SIP message, Extended Markup Language (XML) data, and the like. Furthermore, each endpoint may collect the same type of information (same metrics) or different metrics based on their capabilities, and so on.

QMS 315 may categorize the collected data according to metric type, endpoint type, sub-network, etc., and store in database 342. QMS 351 may then perform functions such as analyzing the data stored in database 342 for a system report, provide the data or the report to other devices/applications, and so on. According to one embodiment, QMS 315 or an application executed on another device may query database 342 periodically and determine if an alert condition is met. If the alert condition is met, an alert may be issued to one or more administrators in a predefined format according to alert process 340. The alert may be in form of an email, a voice call, an instant message, or an audio/visual alert through a network management application user interface.

As mentioned above, in order to provide administrators an efficient tool for addressing network problems, the alerts need to provide location and problem nature information. Thus, the alert process 340 may query the metric information in database 342 and categorize retrieved data based on endpoints such as servers and/or subnets. Moreover, an additional categorization may be performed based on metric type. The previously described metrics may be categorized in two general classes: Network Payload Metrics (NPM) represent a linear combination of network based metrics such as degraded calls, dropped calls, and delayed calls, while Payload Metrics (PM) represent a combination of end device based metrics such as LMOS, CMOS, and SMOS.

According to one embodiment, NPM may be a linear combination of the network based metrics such as sum of network degraded calls, calls with high delay due to network, and failed calls, divided by the total number of calls. PM may be presented by a normal distribution with mean and standard deviation values of LMOS, CMOS, and SMOS.

Thus, the process of determining alerts may include assigning a different category to each server and subnet in the system, placing each metric associated with a call into one of the categories, comparing the values of the metrics against a predefined threshold and classified as acceptable/unacceptable, poor/good, or similarly. If a percentage of calls classified as unacceptable or poor for any category exceeds an alert threshold, the alert may be generated along with the category (i.e. device) information. This approach provides a plurality of flexibilities to the administrators. First, importance of a metric may be defined according to the device it is associated with. For example, the unacceptable or poor classification threshold may be defined differently for each device (e.g. higher for low use end devices, lower for high traffic servers). Second, the alert threshold for the percentage of unacceptable or poor calls may also be set differently for each device or subnet. Moreover, when the alert is issued, it includes not only the device identification, but also the category (or even percentage value) of the failed metrics. Thus, an administrator can immediately identify which device is failing and due to which type of network or device problem. This may save considerable time in addressing the problem since the administrator does not have to spend significant effort on determining the type of problem or the exact location of the problem.

While the determining alerts based on NPM is relatively straight forward, PM category presents a unique challenge since these metrics tend to fluctuate depending on a configuration of each call ("scenario"). For example, a CMOS value may be poor for a call between communication applications running on different PCs, but the same value may be considered good for a call between a communication application running on a PC and a conventional PSTN phone. Further examples include different codecs being used in the communication devices yielding different MOS values or different devices being used for the call yielding different LMOS or SMOS values. Thus, a single category and a single threshold for each payload metric may not provide accurate results and the categories need to be further divided based on different "scenarios". Examples of such further categories based on scenarios include PC-to-PC calls, PC-to-phone calls, etc.

In addition to the further categorization of payload metrics, they also have a statistical character compared to the linear character of NPMs. Thus, a number of calls in each category has to be above a predefined threshold for the metric (PM) to make sense, while this is not needed for the network payload metrics. Therefore, the above described process may be modified for PM type metrics by adding another step for further categorization based on call configuration and statistically averaging (or performing another combination calculation) the collected metrics only if the number of calls exceed a predefined threshold, and then comparing the metrics (or their average) against the alert threshold.

Figure 4:
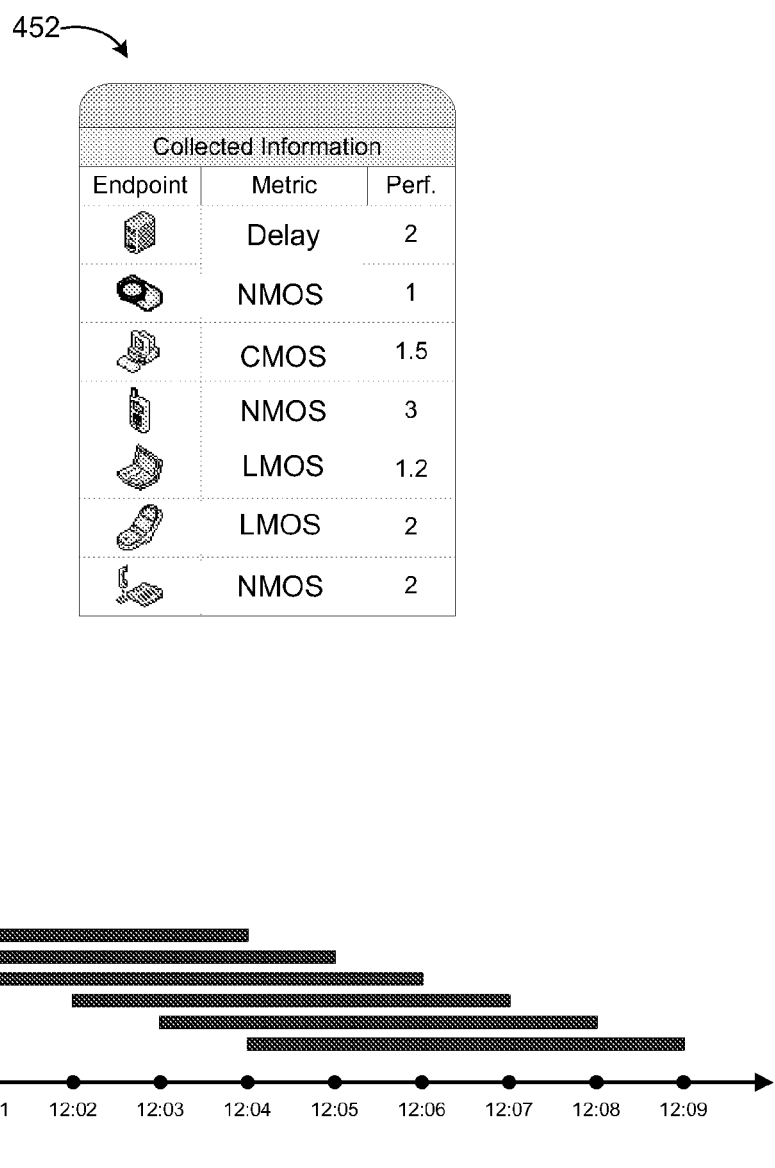
FIG. 4 illustrates example collected metrics for various endpoints and an example of collected metrics database being queried periodically by the alert generation process.

FIG. 4 illustrates example collected metrics for various endpoints and an example of collected metrics database being queried periodically by the alert generation process. Collected information may be formatted by the quality monitoring server as a table (452) that includes endpoint information (although an icon is used in the figure, the endpoint information may include an identification and type of endpoint device/application), metric type, and metric value. The metrics may be assigned values based on simple collected numbers (e.g. dropped calls), statistical calculations (LMOS), or normalized numbers based on the raw data (e.g. a performance index for the endpoint for a particular metric).

Timeline diagram 454 illustrates query of collected metric data by the alert process. Timeline 456 shows time of day and the bars indicate predefined time windows for calls to be collected. For example, the alert process may query the database every minute for reports that were submitted inside a five minute window (each) that ended fifteen seconds before the query (as illustrated in diagram 454). In this configuration, the time windows overlap and calls will be included in more than one calculation, but that increases the accuracy of the system through averaging a wider range of calls in metric collection.

The above described metrics, computation methods, alert formats, and scenarios are for example purposes and do not constitute a limitation on embodiments. Alert generation based on monitored endpoint performance in a unified communication system may be determined and computed using any defined metric and any computation formula using the principles described herein.

Furthermore, the operations and scenarios, as well as components of a unified communication system determining performance of endpoints, described in FIG. 1 through 4 are exemplary for illustration purposes. A unified communication system according to embodiments may be implemented using additional or fewer components and other schemes using the principles described herein.

Figure 5:
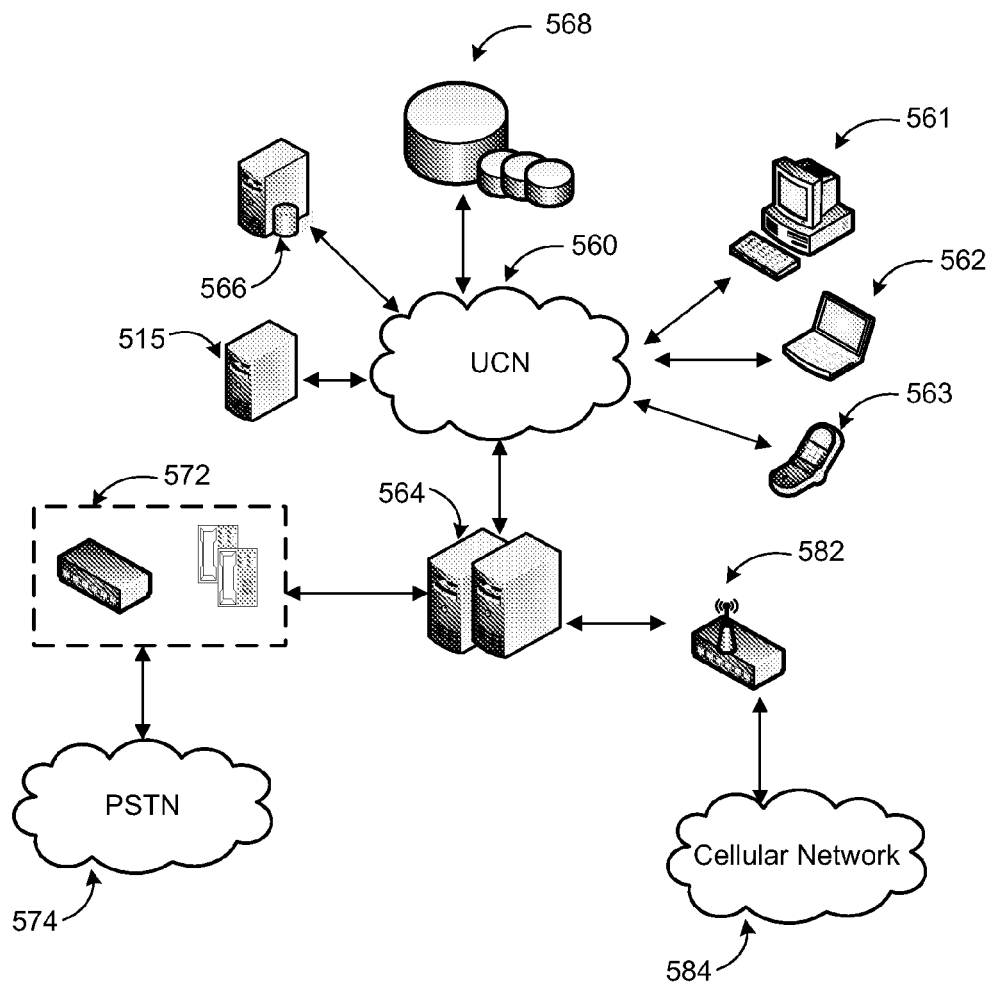
FIG. 5 illustrates a networked environment where embodiments may be implemented.

FIG. 5 is an example networked environment, where embodiments may be implemented. Generating alerts based on monitoring endpoint performance as described previously may be implemented locally or in a distributed manner over a number of physical and virtual clients and servers. Such a system may typically involve one or more networks such as PSTN 574, cellular network 584, and UCN 560. At least one of the systems may be implemented in un-clustered systems or clustered systems employing a number of nodes communicating over one or more networks.

A system according to embodiments may comprise any topology of servers, clients, Internet service providers, and communication media. Also, the system may have a static or dynamic topology. The term "client" may refer to a client application or a client device. A system according to embodiments may involve many more components, typical and relevant ones are discussed in conjunction with this figure.

Mediation server(s) 564 may provide signaling and media exchange between the different systems. A PBX 572 and an RF modem 582 may be used for connection between the PSTN and the cellular networks, respectively, and the mediation server(s) 564. Client devices 561-563 communicate with each other and with devices on other networks through UCN 560. The UC system may also include a UC server (not shown) for registering, routing, and other functionality. Each of these servers and client devices are endpoints of the system as discussed.

QMS server 515 may monitor communication quality within the system by collecting quantitative and qualitative call information from endpoints, aggregating the information and storing in data stores 568 along with data associated with the system configuration (e.g. user names, phone numbers, call policies, configuration, records, etc.), metrics, metric values, and so on. Data stores 568 may be directly accessed by the servers and/or clients of the system or managed through a database server 566. QMS 515 may also execute an alert application (or module) that queries data stores 568 periodically, computes alert conditions, and issues an alert if an alert threshold is exceeded.

UCN 560 provides the backbone of the UC system and may employ a number of protocols such as SIP, RTP, and the like. Client devices (e.g. 561-563) provide platforms for UCN user endpoints. Users may access the communication system using a client device or one or more client applications running on a client device. UCN 560 provides communication between the nodes described herein. By way of example, and not limitation, UCN 560 may include wired media such as a wired network or direct-wired connection, and wireless media such as acoustic, RF, infrared and other wireless media.

Many other configurations of computing devices, applications, data sources, data distribution systems may be employed to implement alert generation through monitoring endpoint performance. Furthermore, the networked environments discussed in FIG. 5 are for illustration purposes only. Embodiments are not limited to the example applications, modules, or processes.

Figure 6:
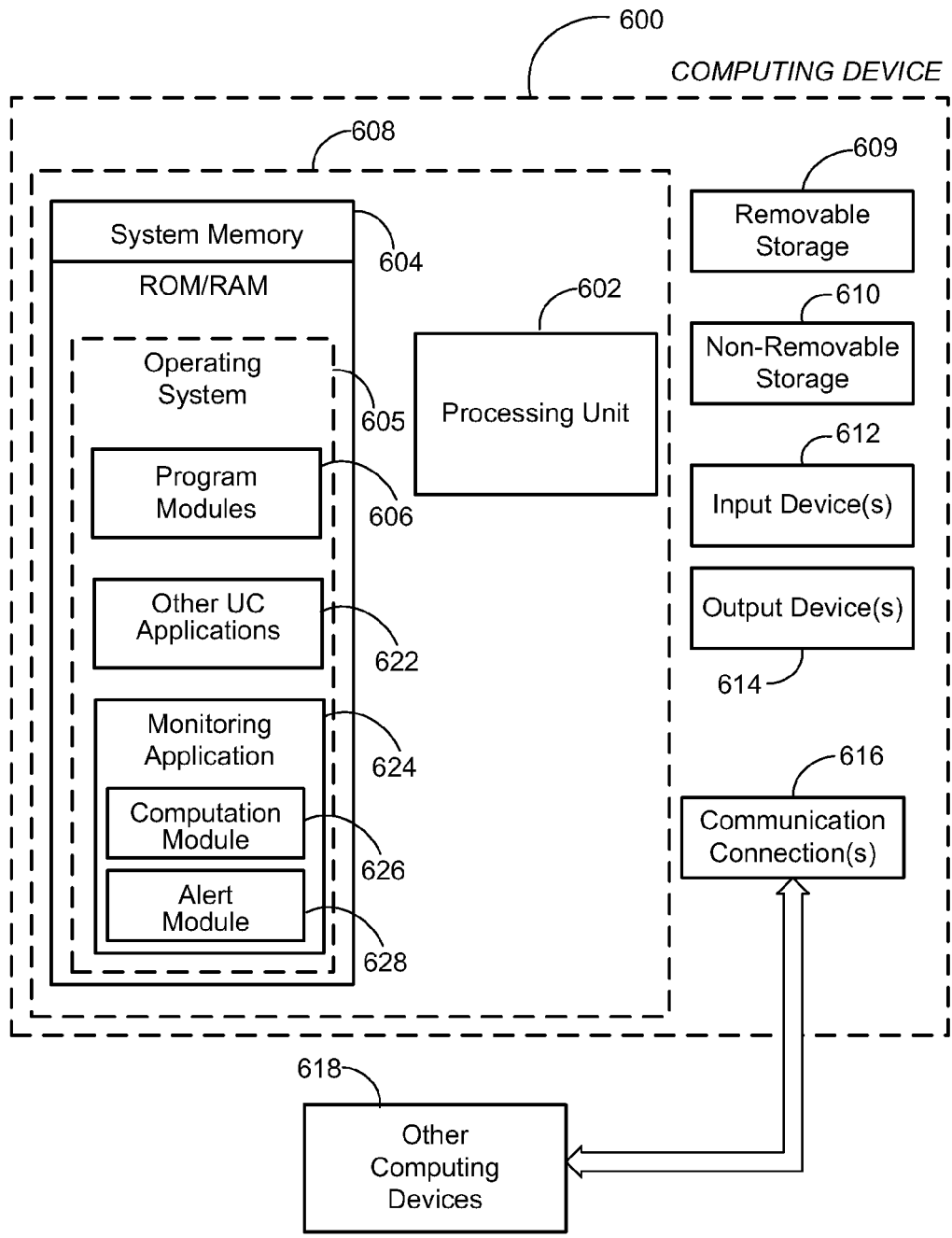
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment is illustrated, such as computing device 600. In a basic configuration, the computing device 600 may be a server executing a communication quality monitoring application for addressing communication quality problems in a unified communication system. Computing device 600 may typically include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the computing device, such as the WINDOWS® operating systems from MICROSOFT CORPORATION of Redmond, Wash. The system memory 604 may also include one or more software applications such as program modules 606, other UC applications 622, and monitoring application 624 with its computation module 626 and alert module 628.

Other UC applications 622 may be separate applications or integral modules of a hosted service application that provide advanced communication services through computing device 600 such signal routing, registration, and communication facilitation services with the end devices of the UC system, as described previously. Monitoring application 624 collects data associated with endpoint performances from the endpoints such as the metrics described previously. The collected data is then used for computing a performance value for each endpoint by computation module 626 based on the metric values and computation/generation of an alert by alert module 628. This basic configuration is illustrated in FIG. 6 by those components within dashed line 608.

The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer storage media may include volatile and non-volatile, removable and non-removable media implemented in any method or technology for storage of information, such as computer readable instructions, data structures, program modules, or other data. System memory 604, removable storage 609 and non-removable storage 610 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of device 600. Computing device 600 may also have input device(s) 612 such as keyboard, mouse, pen, voice input device, touch input device, etc. Output device(s) 614 such as a display, speakers, printer, etc. may also be included. These devices are well known in the art and need not be discussed at length here.

The computing device 600 may also contain communication connections 616 that allow the device to communicate with other computing devices 618, such as over a wireless network in a distributed computing environment, for example, an intranet or the Internet. Other computing devices 618 may include client devices and servers of the UC network defined as endpoints above. Communication connection 616 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The claimed subject matter also includes methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
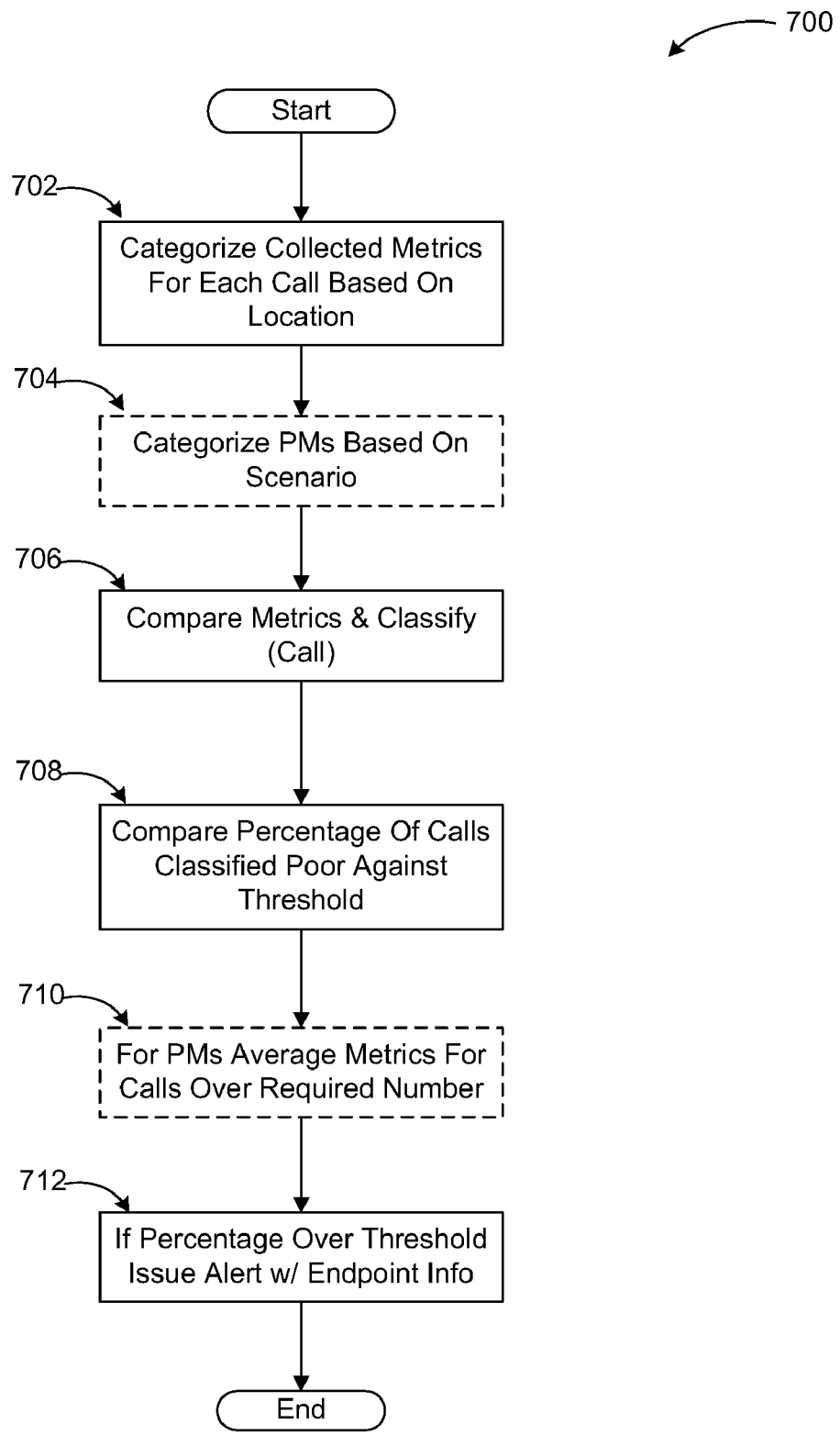
FIG. 7 illustrates a logic flow diagram for a process of generating alerts based on collection of communication quality information from the endpoints according to embodiments.

FIG. 7 illustrates a logic flow diagram for process 700 of generating alerts based on collection of communication quality information from the endpoints according to embodiments. Process 700 may be implemented in a quality monitoring server of a unified communication system.

Process 700 begins with operation 702, where upon querying a quality monitoring database collected metrics are retrieved and categorized for each call based on location such as server, subnet, and so on. By associating the metrics with their endpoints, information can be provided to an administrator eventually when a problem is detected such that the administrator can locate the problem efficiently. Processing advances from operation 702 to optional operation 704.

At optional operation 704, payload metrics are further categorized according to a call configuration or scenario as discussed previously since those metrics may depend on the call configuration. Processing moves from optional operation 704 to operation 706.

At operation 706, the metrics are compared against predefined thresholds and the calls classified based on the comparison of their associated metrics. For example, a call may be classified as poor or good, acceptable or unacceptable, etc. The classification may also be on a sliding scale with additional levels. Processing proceeds from operation 706 to operation 708.

At operation 708, the classified calls are compared to a predefined alert threshold. For example, the percentage of calls classified as poor may be compared to an alert threshold. Processing advances from operation 708 to optional operation 710.

At optional operation 710, payload metrics may be statistically computed such as averaging. For PMs, a minimum number of calls may be required for the result to be statistically significant. Processing moves from optional operation 710 to operation 712.

At operation 712, an alert is issued if the comparison at operation 708 results in the alert threshold being exceeded or an alert condition being met. The alert may be generated in form of an email, a voice call, an instant message, or an audio/visual alert through a user interface of a network management application.

The operations included in process 700 are for illustration purposes. Alert generation based on monitoring endpoint performance in unified communication systems may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for determining alerts based on endpoint performance in a unified communication network (UCN), the method comprising:

retrieving collected call metrics, the call metrics comprising network payload metrics and payload metrics, wherein the network payload metrics comprise a linear combination of a sum of network degraded calls, calls with a high delay due to the network, and failed calls, wherein the linear combination of the sum is divided by a total number of calls, wherein the payload metrics include a Listen Mean Opinion Score (LMOS) that is based on decoded audio received by an endpoint during a session, a Send Mean Opinion Score (SMOS) that is based on pre-encoded audio sent by an endpoint during a session, and a Conversation Mean Opinion Score (CMOS) that is based on a conversational clarity index for a remote endpoint, wherein the payload metrics are presented by a normal distribution with mean and standard deviation values of LMOS, CMOS, and SMOS;

categorizing the retrieved metrics;

comparing values of the categorized metrics to predefined thresholds such that each call associated with a categorized metric is classified;

comparing a number of aggregated calls according to a selected class to an alert threshold; and if the alert threshold is exceeded generating an alert.

2. The method of claim 1, further comprising further categorizing the payload metrics based on a call configuration.

3. The method of claim 2, wherein the call configuration includes calls between one of a computer and another computer, a computer and a telephone, and a computer and a cellular phone.

4. The method of claim 1, wherein comparing values of the categorized metrics to predefined thresholds includes averaging payload metrics for each endpoint.

5. The method of claim 4, further comprising accumulating a predefined minimum number of calls for an endpoint prior to averaging the payload metrics and comparing to the predefined threshold for statistical significance.

6. The method of claim 1, wherein the call metrics are collected through one of: transmission by each endpoint at conclusion of each call, transmission by each endpoint during each call, periodic transmission of aggregated data for a plurality of calls by each endpoint, and transmission of aggregated data for a plurality of calls by each endpoint upon request.

7. The method of claim 1, wherein the endpoints include one of: an end device for facilitating communication through the UCN, an access server, a mediation server, an audio/video conferencing server, and a multipoint conferencing unit.

8. The method of claim 1, wherein a call includes one of: a voice call, a video call, an audio conference, a video conference, an instant message session, an electronic mail exchange, an application sharing session, and a data sharing session, and wherein the generated alert is provided to an administrator through one of an email, a voice call, an instant message, and an audio/visual indication on a user interface of a network management application.

9. The method of claim 1, wherein the call quality metrics are customizable for each endpoint based on a capability of each endpoint.

10. The method of claim 1, further comprising issuing an alert in response the aggregated data exceeding a predetermined threshold for endpoint performance.

11. A system for determining alerts based on endpoint performance in a unified communication network (UCN), the system comprising:

a plurality of endpoints comprising end devices, intermediary devices, and servers associated with the UCN for facilitating communications through the network, each endpoint configured to collect call metrics data;

a quality monitoring server (QMS) associated with the UCN, the QMS configured to:

receive and store the collected call metrics data from each endpoint, the call metrics data comprising network payload metrics and payload metrics, wherein the network payload metrics comprise a linear combination of a sum of network degraded calls, calls with a high delay due to the network, and failed calls, wherein the linear combination of the sum is divided by a total number of calls, wherein the payload metrics include a Listen Mean Opinion Score (LMOS) that is based on decoded audio received by an endpoint during a session, a Send Mean Opinion Score (SMOS) that is based on pre-encoded audio sent by an endpoint during a session, and a Conversation Mean Opinion Score (CMOS) that is based on a conversational clarity index for a remote endpoint, wherein the payload metrics are presented by a normal distribution with mean and standard deviation values of LMOS, CMOS, and SMOS;

categorize the metrics data based on endpoints collecting the metrics data;

if the call metrics include metrics associated with endpoint characteristics, further categorize the call metrics data associated with endpoint characteristics based on a call configuration;

compare the categorized metric data to predefined thresholds such that each call associated with a categorized metric is classified as one of acceptable and unacceptable;

compare a number of aggregated calls according to a selected class to an alert threshold;

issue an alert to an administrator if the alert threshold is exceeded.

12. The system of claim 11, wherein the call configuration is determined based on end device types involved in the call.

13. The system of claim 11, wherein the QMS is further configured to:

aggregate a predefined minimum number of calls and statistically combine the call metrics associated with the endpoint characteristic before comparing the call metrics associated with the endpoint characteristic to the predefined threshold.

14. The system of claim 11, wherein the call metrics data is retrieved from a data store periodically for calls within a predetermined time window.

15. The system of claim 14, wherein the retrieval period and the time window are selected such that at least a portion of the calls within any two time windows overlap.

16. A non-transitory computer-readable storage medium embedded with a computer-executable program for determining alerts based on endpoint performance in a unified communication network (UCN), comprising:

collecting and storing data associated with call metrics from endpoints comprising end devices, intermediary devices, and servers associated with the UCN for facilitating communications through the network at conclusion of each call, wherein a call includes at least one from a set of: a voice call, a video call, an audio conference, a video conference, an instant message session, an electronic mail exchange, an application sharing session, and a data sharing session;

retrieving the stored data periodically for calls concluded within a predetermined time window, wherein the retrieval period and the time window are selected such that at least a portion of the calls within any two time windows overlap;

categorizing the retrieved data based on associated servers and subnets, the data including network payload metric values (NPM) and payload metric values (PM), wherein NPM is a linear combination of a sum of a number of network degraded calls, a number of network delayed calls, and a number of failed calls, wherein the linear combination of the sum is divided by a number of total calls, and wherein PM is presented by a normal distribution with mean and standard deviation values comparing the categorized metric data to predefined thresholds such that each call associated with a categorized metric is classified according to the comparison;

comparing a number of aggregated calls according to a selected class to an alert threshold; and if the alert threshold is exceeded, issuing an alert through one of an email, a voice call, an instant message, and an audio/visual indication on a user interface of a network management application.

17. The non-transitory computer-readable storage medium of claim 16, further comprising:

further categorizing the payload metric data based on end device characteristics involved in a call; and averaging the payload metric data before comparing to the predefined thresholds.

* * * * *